US008684708B2

(12) United States Patent
Ou et al.

(10) Patent No.: US 8,684,708 B2
(45) Date of Patent: Apr. 1, 2014

(54) FAN STATOR COVER STRUCTURE

(75) Inventors: Wu-Chao Ou, Sinjhuang (TW); Na Hai, Sinjhuang (TW)

(73) Assignee: Asia Vital Components Co., Ltd., New Taipei (TW)

( * ) Notice: Subject to any disclaimer, the term of this patent is extended or adjusted under 35 U.S.C. 154(b) by 714 days.

(21) Appl. No.: 12/639,248

(22) Filed: Dec. 16, 2009

(65) Prior Publication Data
US 2011/0140553 A1 Jun. 16, 2011

(51) Int. Cl.
*F01D 25/24* (2006.01)

(52) U.S. Cl.
USPC .................................. 417/423.7; 417/423.14

(58) Field of Classification Search
USPC ......................................... 417/423.7, 423.14
See application file for complete search history.

(56) References Cited

U.S. PATENT DOCUMENTS

| | | | |
|---|---|---|---|
| 6,174,145 B1 * | 1/2001 | Taniguchi | 417/423.14 |
| 6,386,276 B1 | 5/2002 | Chen et al. | |
| 6,462,443 B2 | 10/2002 | Horng | |
| 6,726,455 B2 * | 4/2004 | Horng et al. | 417/14 |
| 7,066,720 B2 * | 6/2006 | Cheng et al. | 417/423.3 |
| 7,245,056 B2 * | 7/2007 | Matsumoto | 310/309 |
| 7,811,069 B2 * | 10/2010 | Fleig | 417/423.14 |
| 2007/0041857 A1 * | 2/2007 | Fleig | 417/423.14 |
| 2009/0072656 A1 * | 3/2009 | Eisert et al. | 310/244 |
| 2011/0097226 A1 * | 4/2011 | Nakamura et al. | 417/423.14 |

FOREIGN PATENT DOCUMENTS

JP 2003088037 A * 3/2003 ............... H02K 5/22

OTHER PUBLICATIONS

Machine Translation of JP 2003-88037.*

* cited by examiner

*Primary Examiner* — Christopher Bobish

(57) ABSTRACT

A fan stator cover structure including a main body having a front face and a back face. The main body is formed with at least one through hole and chucking sections respectively disposed on the front and back faces of the main body. The through hole is formed through the main body from the front face to back face. A protrusion body is disposed on the back face and protrudes therefrom to cover the through hole. The protrusion body has at least one open side in communication with the through hole. The main body defines a receiving space and is further formed with a perforation in communication with the receiving space. Wires can be extended through the perforation into the receiving space and chucked in the chucking sections of the front face and then extended through the through hole to the back face and chucked in the chucking sections thereof.

4 Claims, 8 Drawing Sheets

FAN STATOR COVER STRUCTURE

FIELD OF THE INVENTION

The present invention relates generally to a stator cover structure, and more particularly to a fan stator cover structure with enhanced locating effect for the wires. With the fan stator cover structure, the operation efficiency is promoted and the cost for the printed circuit board is saved.

BACKGROUND OF THE INVENTION

Following the rapid development of electronic industries, the performances of all kinds of electronic components have been greatly promoted to have faster and faster processing speed. Also, the internal chipset of an electronic component contains more and more chips. The chips work at high speed and generate high heat at the same time. The heat must be efficiently dissipated outward. Otherwise, the performances of the electronic component will be greatly affected to slow down the processing speed of the electronic component. In some more serious cases, the electronic component may be crashed or even burnt out due to overheating. Therefore, heat dissipation has become a critical issue for all kinds of electronic components. A cooling fan is often used as a heat dissipation device for the electronic components.

A conventional cooling fan includes a rotor assembly and a stator assembly. After powered on, alternating magnetic field is produced around the stator of the stator assembly to cross the lines of magnetic force of the rotor. Accordingly, a torque is applied to the rotor to make it rotate. When the rotor rotates, it is necessary to keep the stator assembly secured in the fan housing without swinging, whereby the rotor can stably rotate. A stator cover is positioned between the stator assembly and the fan housing for assembling the stator assembly therewith.

FIGS. 1A and 1B show a conventional stator cover structure including a main body 1. The main body 1 defines an internal receiving space 11 and is formed with a through hole 12 in communication with the receiving space 11. A motor stator 13 and a printed circuit board 14 are arranged in the receiving space 11. Enameled wires 131 are wound around the motor stator 13. The terminals of the enameled wires 131 are soldered on the printed circuit board 14. The printed circuit board 14 is electrically connected with the enameled wires 131 via wires 15. The ends of the wires 15 are electrically connected with the enameled wires 131. The wires 1 are wound in the receiving space 11 and pulled out of the main body 1 through the through hole 12. Accordingly, after powered on, alternating magnetic field is produced around the enameled wires 131 of the motor stator 13 to drive the rotor (not shown). According to the above arrangement, the terminals of the enameled wires 131 are soldered on the printed circuit board 14 and the printed circuit board 14 is electrically connected with the enameled wires 131 via the wires 15. The cost for the printed circuit board 14 is high. Moreover, the soldering points between the wires 15 and the enameled wires 131 and the printed circuit board 14 tend to break due to pulling. This will lead to failure of the fan. Therefore, the conventional fan stator cover has the following defects:
1. The cost for the printed circuit board is high.
2. The soldering points between the wires and the printed circuit board tend to break due to pulling.
3. The fan is apt to failure.

SUMMARY OF THE INVENTION

A primary object of the present invention is to provide a fan stator cover structure in which a motor stator can be mounted without using any printed circuit board.

A further object of the present invention is to provide the above fan stator cover structure, which is manufactured at lower cost.

A still further object of the present invention is to provide the above fan stator cover structure, which has enhanced locating effect for wires.

A still further object of the present invention is to provide the above fan stator cover structure in which the soldering points are prevented from breaking due to pulling.

To achieve the above and other objects, the fan stator cover structure of the present invention includes a main body having a front face and a back face. The main body is formed with at least one through hole and chucking sections respectively disposed on the front and back faces of the main body. The through hole is formed through the main body from the front face to back face. A protrusion body is disposed on the back face and protrudes therefrom to cover the through hole. The protrusion body has at least one open side in communication with the through hole. The main body defines a receiving space and is further formed with a perforation in communication with the receiving space. Wires can be extended through the perforation into the receiving space and chucked in the chucking sections of the front face and then extended through the through hole to the back face and chucked in the chucking sections thereof. The fan stator cover structure provides enhanced locating effect for the wires. In addition, with the fan stator cover structure, the operation is facilitated. Also, with the fan stator cover structure, the cost for the printed circuit board is saved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
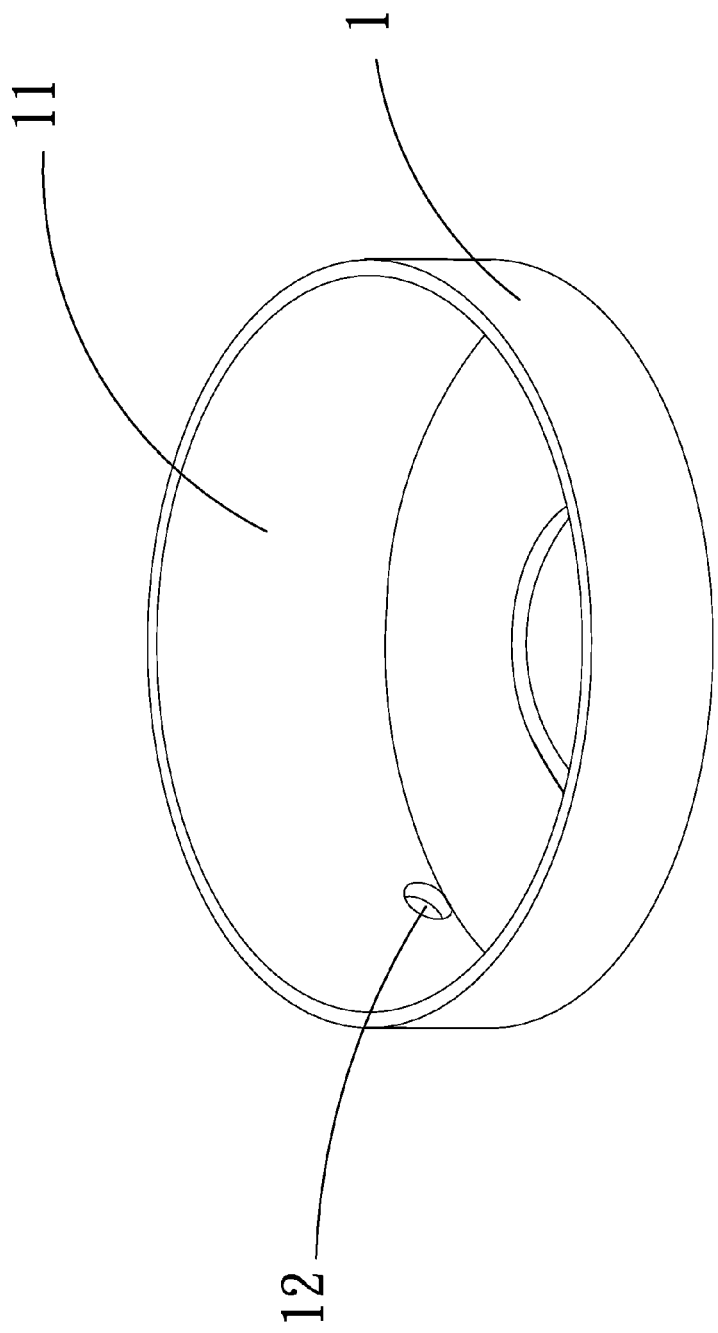
FIG. 1A is a perspective view of a conventional fan stator cover structure.
Figure 1B:
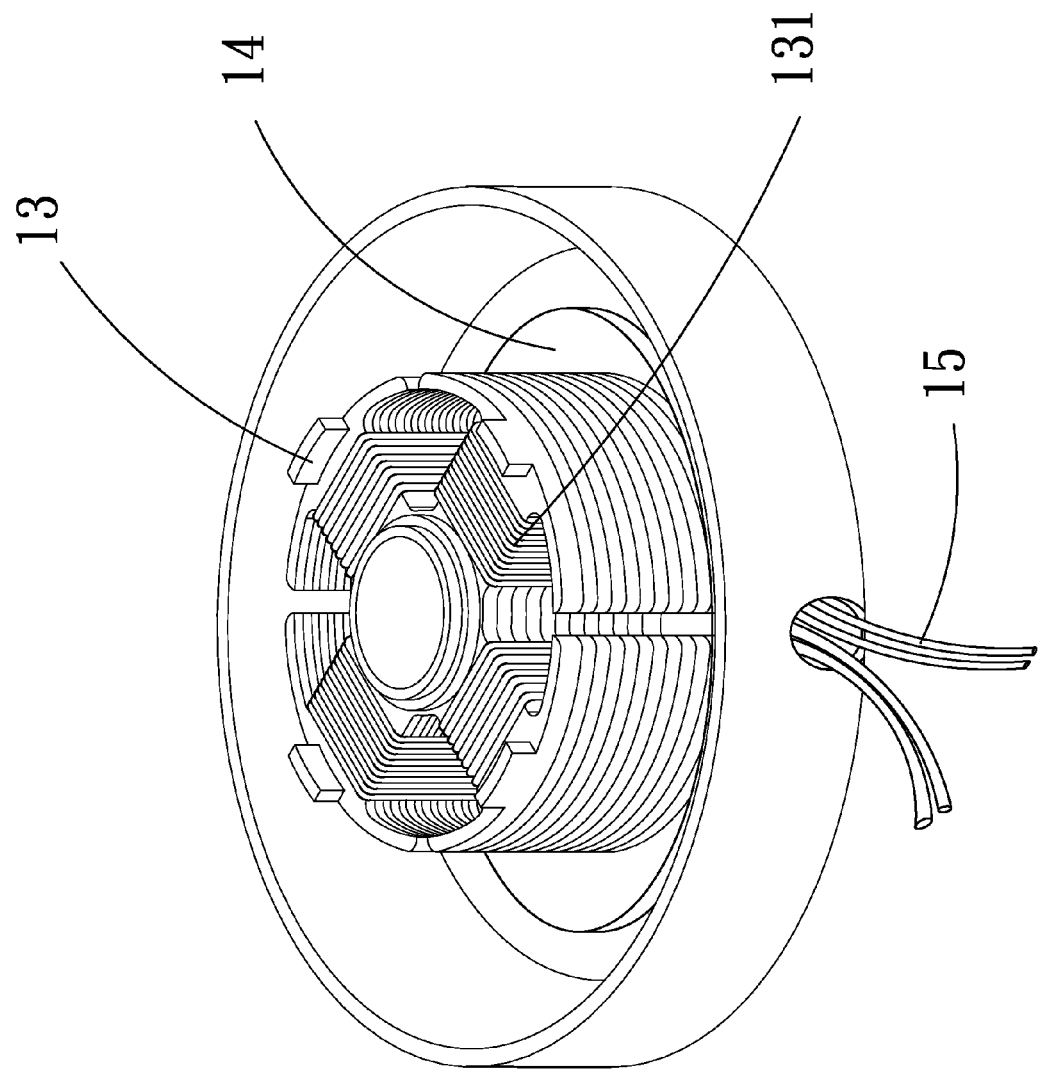
FIG. 1B is a perspective view of the conventional fan stator cover structure, showing that a stator is mounted therein.
Figure 2:
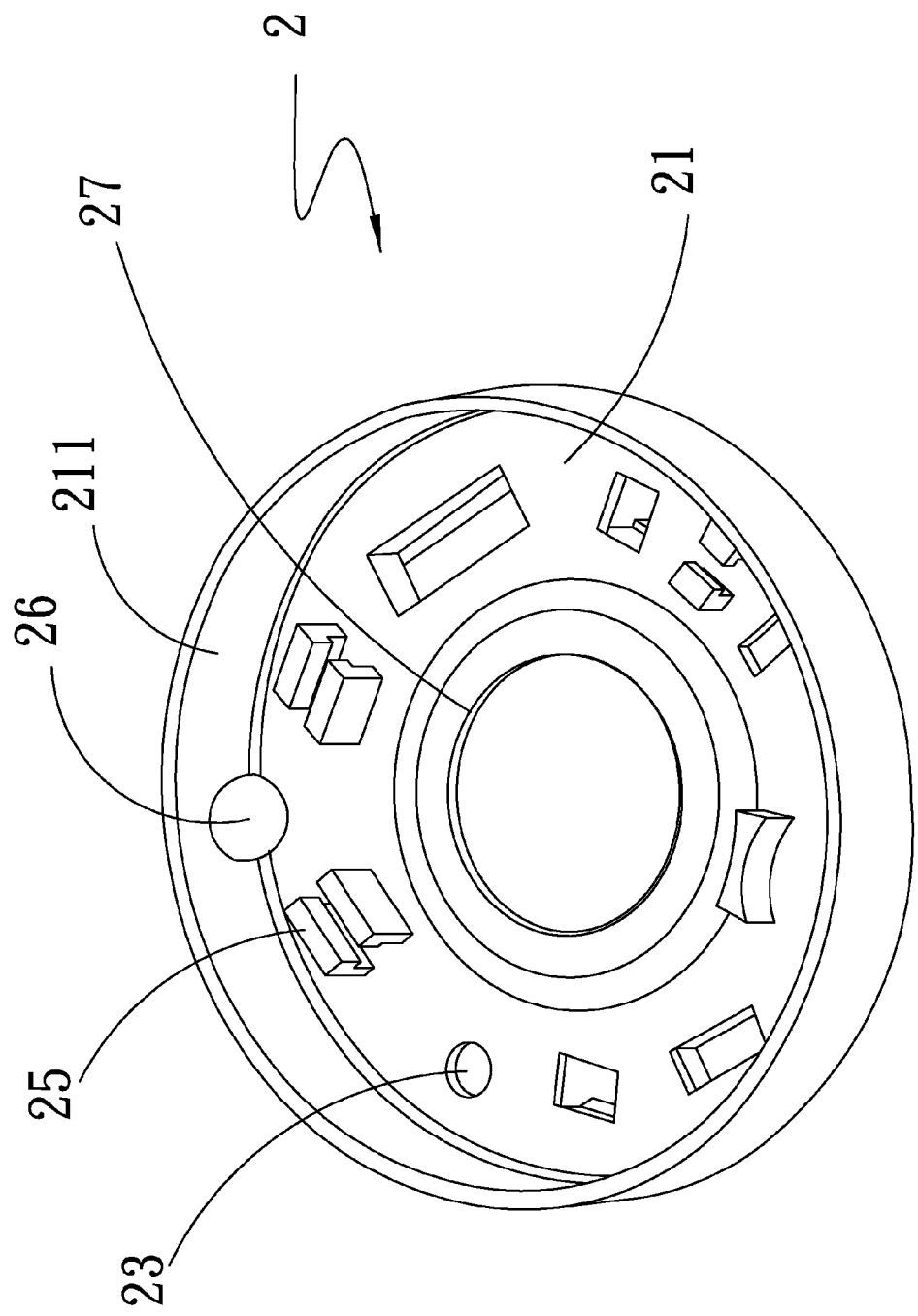
FIG. 2 is a perspective view of a preferred embodiment of the fan stator cover structure of the present invention.
Figure 3:
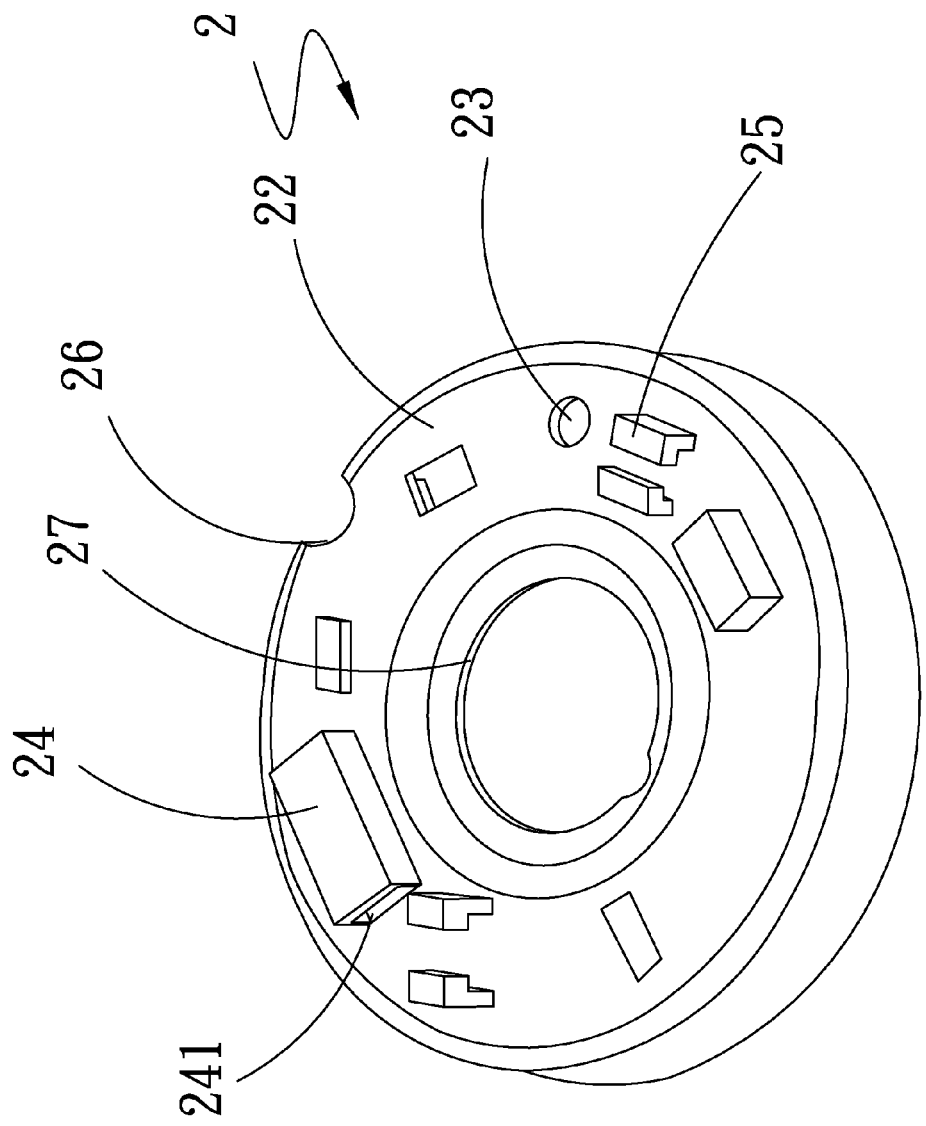
FIG. 3 is a perspective, view of the preferred embodiment of the fan stator cover structure of the present invention, seen in another direction.
Figure 4:
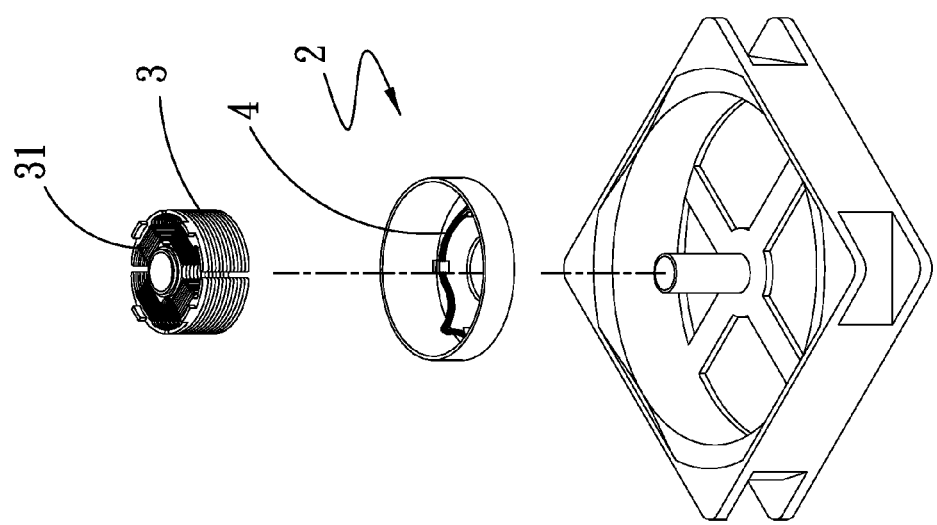
FIG. 4 is a perspective exploded view showing that a stator is mounted in the fan stator cover structure of the present invention.

Please refer to FIGS. 2 and 3. According to a preferred embodiment, the fan stator cover structure of the present invention includes a main body 2 having a front face 21 and a back face 22. A receiving space 211 is defined on the front face 21. The main body 2 is formed with at least one through hole 23 and chucking sections 25. The through hole 23 is formed through the main body 2 from the front face 21 to the back face 22. A protrusion body 24 is disposed on the back face 22 and protrudes therefrom. The protrusion body 24 has at least one open side 241. The chucking sections 25 are respectively disposed on the front face 21 and the back face 22 of the main body 2. The main body 2 is further formed with a perforation 26 in communication with the receiving space 211. In addition, a hollow 27 is formed at a center of the main body 2.

Please refer to FIGS. 2, 3, 4, 5 and 6. A motor stator 3 is mounted on the front face 21 of the main body 2 and received in the receiving space 211. Enameled wires 31 are wound around the motor stator 3. The Enameled wires 31 are functionally divided into secondary windings, common leads and primary windings. Different Enameled wires 31 with different functions are wound in specific directions and are uniformly laid in the receiving space 211. The Enameled wires 31 are further pulled from the front face 21 of the main body 2 through the through hole 23 to the back face 22 of the main body 2. Multiple wires 4 are arranged in the receiving space 211. The wires 4 extend through the perforation 26 into the receiving space 211 of the front face 21 of the main body 2. After passing through the perforation 26, the wires 4 are wound and chucked in the chucking section 25 of the front face 21. In the case that the wires 4 have a longer length to wind, the wires 4 can be further chucked in another chucking section 25 to enhance locating effect. After securely chucked in the chucking sections 25 of the front face 21 of the main body 2, the wires 4 are pulled through an adjacent through hole 23 from the front face 21 to the back face 22 of the main body 2. Thereafter, the wires 4 are wound and chucked in the chucking sections 25 of the back face 22 of the main body 2.

Figure 5:
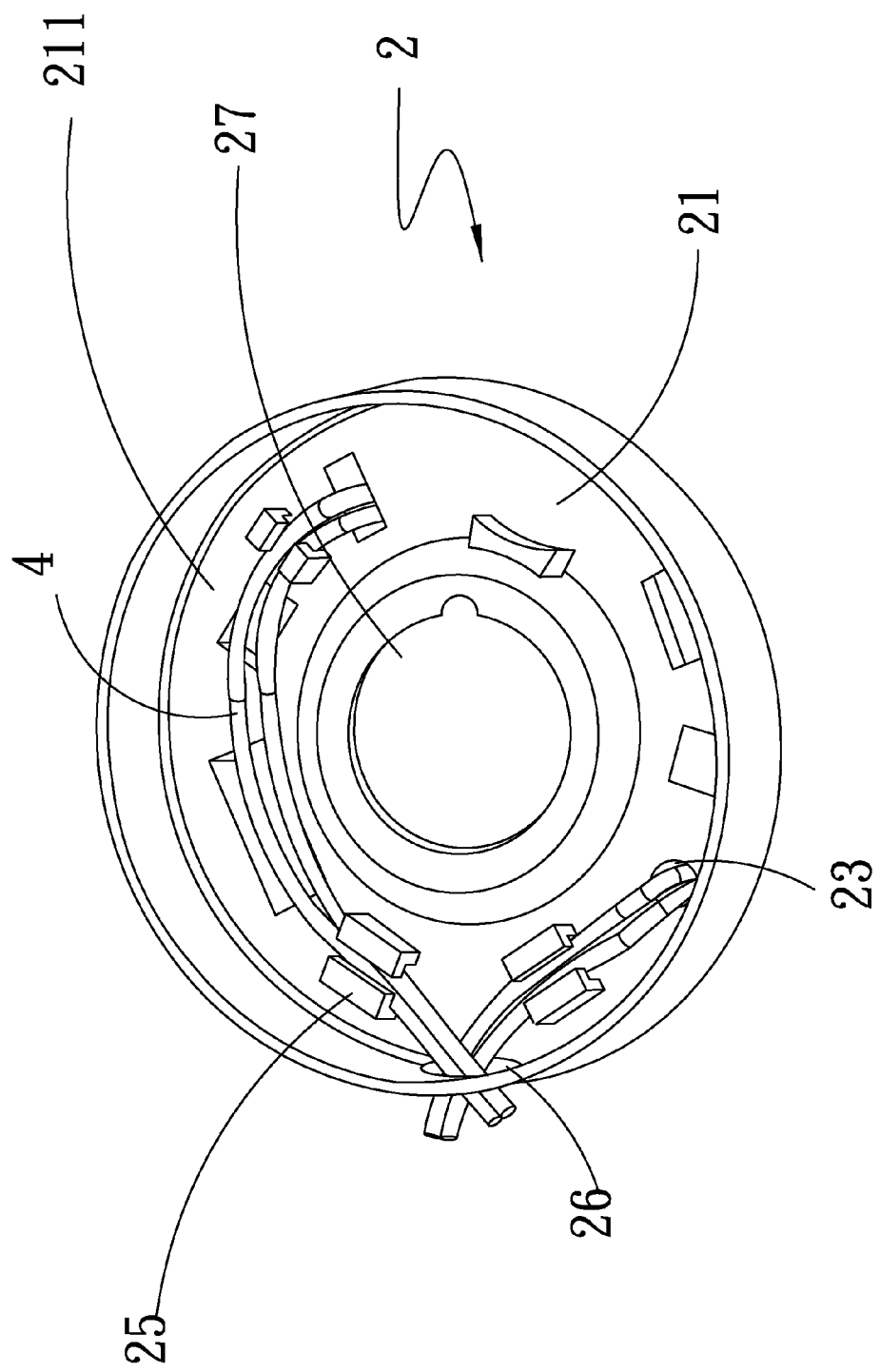
FIG. 5 is a front perspective view of the preferred embodiment of the fan stator cover structure of the present invention, showing the layout of the wires.
Figure 6:
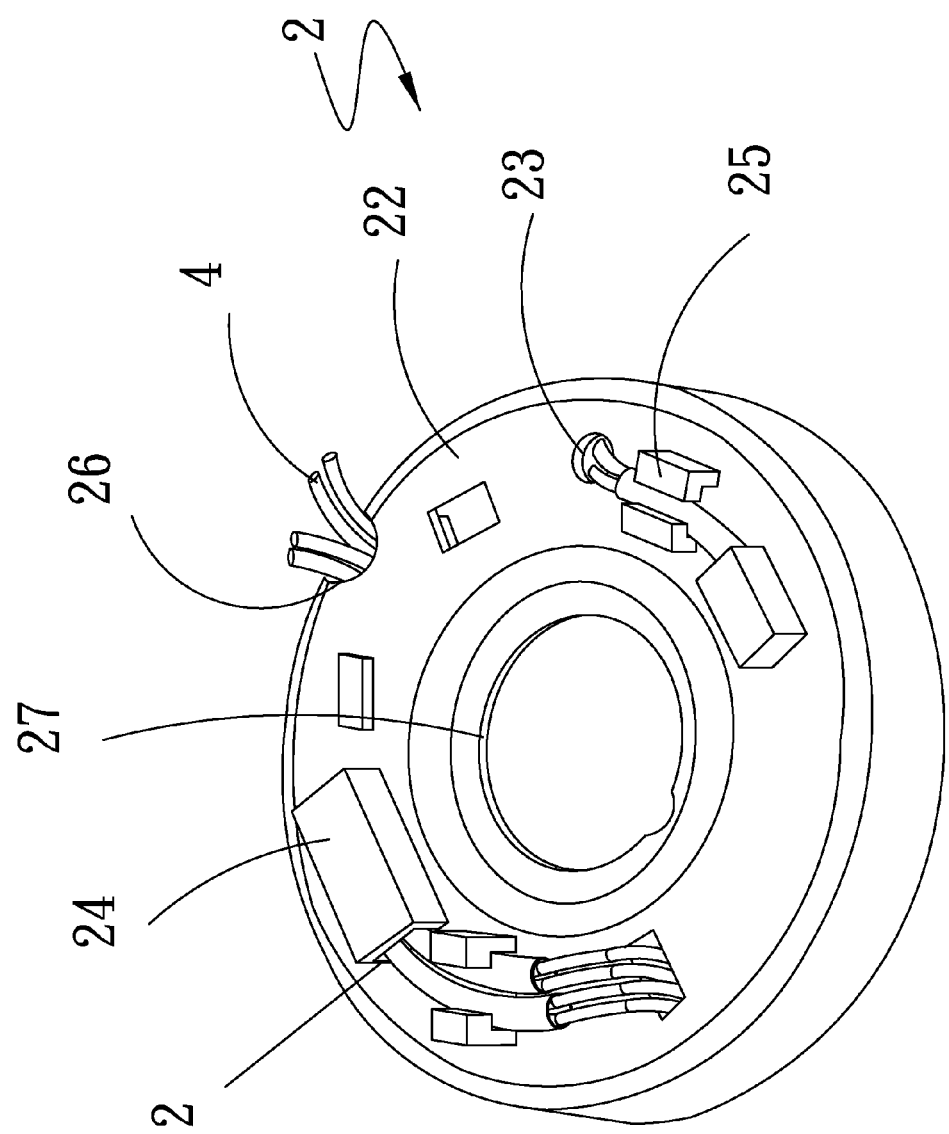
FIG. 6 is a back perspective view of the preferred embodiment of the fan stator cover structure of the present invention, showing the layout of the wires.

In this embodiment, after passing through the perforation 26, the wires 4 are wound in two directions (as shown in FIG. 5). In a first direction, the wires 4 are wound along an upper side of the hollow 27 and chucked in the chucking section 25. In the case that the wires 4 have a longer length to wind, the wires 4 can be further chucked in another chucking section 25. Then the wires 4 are pulled through the through hole 23 to the back face 22 of the main body 2. Also, the common leads and the secondary windings of the enameled wires 31 are extended through the through hole 23 to the back face 22 of the main body 2 and soldered with the wires 4 on the back face 22. The soldering points between the common leads and secondary windings of the enameled wires 31 and the wires 4 are accommodated in the open side 241 of the protrusion body 24 and securely received in the protrusion body 24. Accordingly, the wires 4 are more firmly located and the soldering points are prevented from breaking due to external pulling force.

In a second direction, the wires 4 are wound along a lower side of the hollow 27 and chucked in the chucking section 25 (as shown in FIG. 5). Then the wires 4 are pulled through the through hole 23 to the back face 22 of the main body 2. Also, the primary windings of the enameled wires 31 are extended through the through hole 23 to the back face 22 of the main body 2 and soldered with the wires 4 on the back face 22. The soldering points between the primary windings of the enameled wires 31 and the wires 4 are accommodated in the open side 241 of the protrusion body 24 and securely received in the protrusion body 24. Accordingly, the wires 4 are more firmly located and the soldering points are prevented from breaking due to external pulling force. In this case, the printed circuit board is omissible.

Figure 7:
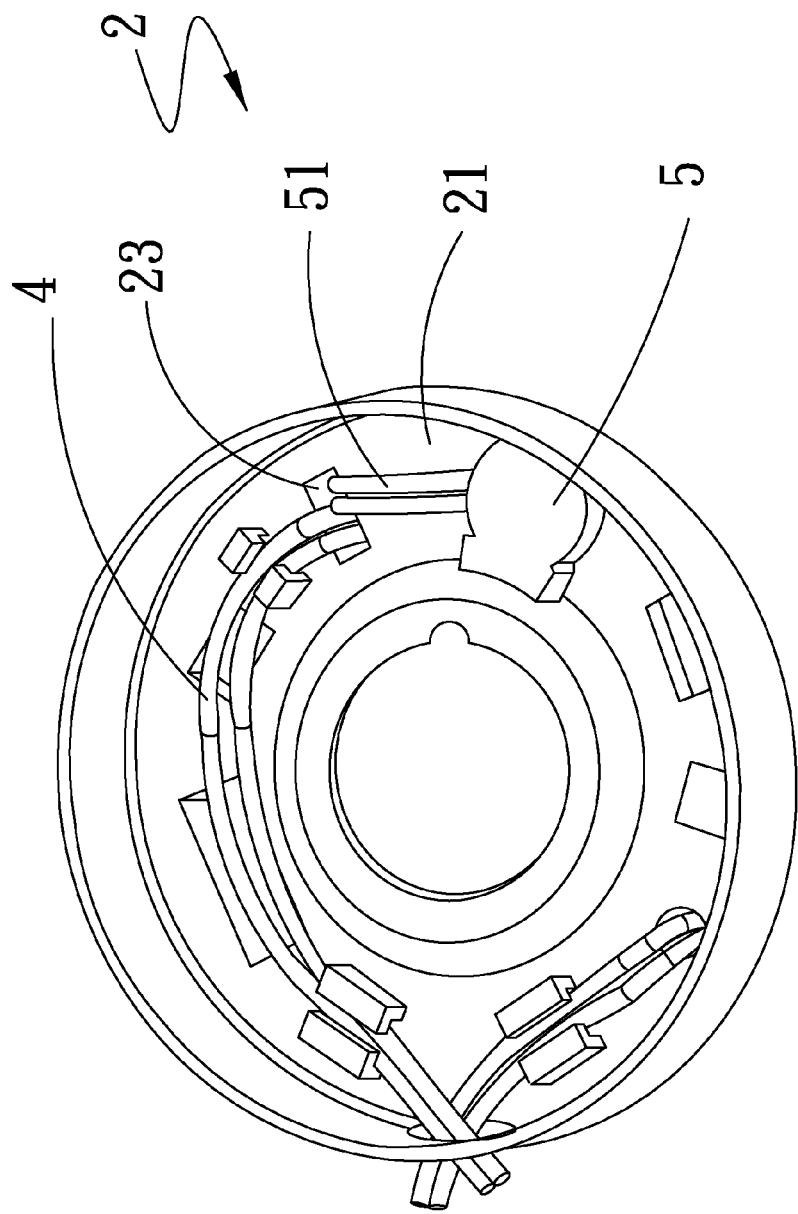
FIG. 7 is a perspective view of another embodiment of the fan stator cover structure of the present invention, showing the layout of the wires.

Please now refer to FIGS. 3 and 7. According to another embodiment of the present invention, a temperature switch 5 is disposed on the front face 21 or the back face 22 of the main body 2. Preferably, the temperature switch 5 is disposed on the front face 21 of the main body 2. The temperature switch 5 has temperature switch wires 51 electrically connected with the wires 4 and the enameled wires 31 (with reference to FIG. 4). The temperature switch wires 51 are pulled through the through hole 23 from the front face 21 to the back face 22 of the main body 2. The temperature switch wires 51 are chucked in the chucking section 25 of the back face 22 of the main body 2 and soldered with the wires 4 and the enameled wires 31 on the back face 22 (with reference to FIG. 4). The soldering points between the temperature switch wires 51 and the wires 4 and the enameled wires 31 are accommodated in the open side 241 of the protrusion body 24 and securely received in the protrusion body 24. Accordingly, the wires 4 are more firmly located and the soldering points are prevented from breaking due to external pulling force.

According to the above arrangement, the fan stator cover structure of the present invention has the following advantages:

1. The printed circuit board is omissible.
2. The locating effect for the wires is enhanced.
3. The possibility of breakage of the wires is minimized.
4. The operation time is shortened.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan stator cover structure designed to be contained within a separate fan housing comprising a main body having a front face for receiving a fan stator and a back face, the main body being formed with at least one through hole and chucking sections, the through hole being formed through the main body from the front face to the back face for wires to pass through, the chucking sections being respectively disposed on the front face and the back face of the main body for chucking the wires;

wherein a protrusion body is disposed on the back face of the main body and protrudes therefrom, the protrusion body having at least one open side;

wherein the main body defines a receiving space for accommodating a motor stator therein, the motor stator being connected to the wires;

wherein the wires are wound and chucked in the chucking sections on the front face of the main body; and wherein the wires are wound and chucked in the chucking sections on the back face of the main body.

2. The fan stator cover structure as claimed in claim 1, wherein a temperature switch is disposed on the front face or back face of the main body.

3. The fan stator cover structure as claimed in claim 1, wherein the main body is further formed with a perforation in communication with the receiving space for the wires to pass through.

4. The fan stator cover structure as claimed in claim 1, wherein a hollow is formed on the main body, the wires being wound around the hollow and passed through the through hole to be chucked in the chucking sections.

* * * * *